Patented Nov. 3, 1953

2,658,067

UNITED STATES PATENT OFFICE 2,658,067

SUBSTITUTED CARBAMIC ACID ESTERS

Robert Duschinsky, Essex Fells, N. J., assignor to Hoffmann-La Roche Inc., Nutley, N. J., a corporation of New Jersey No Drawing. Application June 19, 1952,
Serial No. 294,478

5 Claims. (Cl. 260—294.3)

This invention relates to novel compounds having therapeutic utility; for example, the compounds of the invention are spasmolytics. More particularly, the invention relates to 3-benzhydrylcarbamyloxy-quinuclidine and 3-α-cyclohexylcarbamyloxy-quinuclidine; substitution products of each of the foregoing wherein the position of substitution is restricted to a monocyclic nucleus, that is, to a phenyl ring or to a cyclohexyl ring, or to both; and salts of any of the foregoing bases, including acid addition salts and quaternary salts of said bases.

A preferred embodiment of the invention comprises bases having the following formula

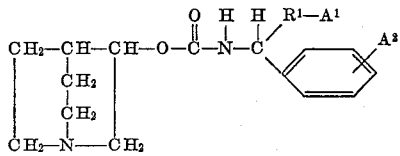

wherein $R^1$ represents a hydrocarbon radical selected from the group consisting of phenylene (—$C_6H_4$—) and cyclohexylene (—$C_6H_{10}$—), and $A^1$ and $A^2$ each represents a member of the group consisting of hydrogen, halogen, nitro, lower alkyl and lower alkoxy, and acid addition salts of said bases and quaternary ammonium salts of said bases.

The compounds of the invention can be prepared either by reacting 3-quinuclidinol [Sternbach and Kaiser, J. Am. Chem. Soc. 74, 2215 (1952)] with 4,4-diphenyl-2,5-oxazolidinedione, or by reacting 3-quinuclidinol with an isocyanate having the formula

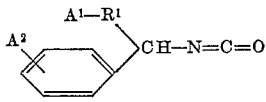

wherein $R^1$ represents a phenylene or a cyclohexylene radical, and $A^1$ and $A^2$ each represents hydrogen or a substituent, e. g. as defined above.

Every compound of the instant invention has at least one asymmetric carbon atom, and some have two asymmetric carbon atoms. It should be understood that the invention includes all of the disastereoisomeric, i. e. all of the racemic and optically active, forms of the compounds disclosed herein, and the claims should be so construed.

The invention is further disclosed in the following examples, which are illustrative but not limitative thereof. All melting points are corrected.

EXAMPLE 1

Method A

A mixture of 5.06 g. (0.02 mol) of 4,4-diphenyl-2,5-oxazolidinedione, 2.34 g. (0.02 mol) of 3-quinuclidinol and 15 ml. of xylene was refluxed for 3 hours, i. e., until the carbon dioxide evolution ceased. Addition of 15 ml. of petroleum ether produced crystals which were washed with a mixture of chloroform and petroleum ether. Yield, 3.13 g. (46.5%). After recrystallization from 10 ml. of chloroform, the product, 3-benzhydrylcarbamyloxyquinuclidine, melted at 148°–149° C.

Method B

A mixture of 3.81 g. (0.03 mol) of 3-quinuclidinol, 6.28 g. (0.03 mol) of benzhydrylisocyanate and 60 ml. of xylene was refluxed for 1¼ hours. The clear solution became, upon standing, completely filled with crystals which were filtered and washed with xylene and petroleum ether. Yield, 8.9 g. (88.5%). The product was found to be identical by mixed melting point with the base obtained by Method A.

The hydrochloride was obtained by dissolving the above 8.9 g. of base in 50 ml. of warm methanol, adding 5 ml. of 8.8 N alcoholic hydrochloric acid and precipitating by gradual addition of 700 ml. of ether. M. P. 239°–241° C.

A solution of 0.67 g. (0.002 mol) of 3-benzhydrylcarbamyloxy-quinuclidine in 5 ml. of chloroform was mixed with a solution of 0.38 g. (0.004 mol) of methyl bromide in 1 ml. of acetone. A gentle exothermic reaction took place and crystallization began in a few minutes. After allowing the mixture to stand in the dark overnight, the reaction product, 1-methyl-3-benzhydrylcarbamyloxyquinuclidinium bromide, was filtered and washed with a mixture of equal amounts of acetone and ether. M. P. 235° C.

A solution of 1.34 g. (0.004 mol) of 3-benzhydrylcarbamyloxy-quinuclidine in 10 ml. of chloroform was mixed with 0.87 g. (0.008 mol) of ethyl bromide. After refluxing the mixture one hour on the steam bath it was evaporated to dryness in vacuo and the residue obtained was dissolved in 2 ml. of methanol and crystallized by addition of ether. The product, 1-ethyl-3-benzhydrylcarbamyloxyquinuclidinium bromide, was filtered, washed with a mixture of 1 volume of methanol and 2 volumes of ether and then with ether. M. P. 230°–231° C.

A solution of 0.67 g. (0.002 mol) of 3-benzhydrylcarbamyloxy-quinuclidine and 0.55 g. (0.004 mol) of n-butyl bromide in 5 ml. chloroform was refluxed for 1 hour. Evaporation to dryness gave a residue which was mostly insoluble in hot water. Therefore, the residue was refluxed ¾ hour with 10 ml. of n-butyl bromide. After evaporation of the excess butyl bromide the material was dissolved in 5 ml. of methanol and crystallized by gradual addition of 20 ml. of ether. After filtration, it was washed with a mixture of 1 volume of methonol and 4 volumes ether. The product, 1-n-butyl-3-benzhydryl-carbamyloxylquinuclidinium bromide, had M. P. 234°–235° C.

EXAMPLE 2

Cyclohexyl magnesium chloride was reacted with benzaldehyde to give α-phenylcyclohexane-methanol, which was then converted into bromocyclohexylphenylmethane by the action of phosphorus pentabromide. In a solution of 16.4 g. (0.0647 mol) of bromocyclohexylphenylmethane in 100 ml. dry ether was suspended 13 g. (0.087 mol) of silver cyanate. The mixture was refluxed with stirring for 3½ hours. The silver bromide was filtered and washed with dry ether. Evaporation of the solvent and fractionation in vacuo gave α-cyclohexylbenzyl isocyanate boiling at 111° C./0.8 mm.

A solution of 1.72 g. (0.0135 mol) of 3-quinuclidinol and 2.9 g. (0.0135 mol) of α-cyclohexyl-benzyl isocyanate in 13 ml. of xylene was refluxed for 40 minutes. Some insoluble material was filtered from the hot solution, which upon cooling gave crystals which were washed with xylene and then petroleum ether. After recrystallization from 40 ml. of ethyl acetate, the product, 3-α-cyclohexylbenzylcarbamyloxy-quinuclidine, M. P. 163°–164° C. was obtained.

To obtain the hydrochloride, 0.34 g. (0.001 mol) of the above base was dissolved in a mixture of 0.2 ml. of approximately 8 N alcoholic hydrochloric acid and 0.6 ml. of acetone. Addition of 1.5 ml. of ether produced an oily precipitate which crystallized upon standing. It was filtered and washed with acetone and finally ether; M. P. 225°–228° C. with decomposition.

A solution of 2.05 g. (0.006 mol) of 3-α-cyclohexylbenzylcarbamyloxy-quinuclidine in 24 ml. of acetone containing approximately 25% (0.063 mol) of methyl bromide was allowed to stand for 18 hours while crystallization of the reaction product took place. The product, 1-methyl-3-(α-cyclohexylbenzylcarbamyloxy)quinuclidinium bromide monohydrate, was filtered and washed with acetone; M. P. 240°–242° C. Recrystallization by dissolving in 5 volumes methanol and adding 25 volumes of ether raised the melting point to 243°–244° C.

EXAMPLE 3 p-Methylbenzhydrol was converted into p-methylbenzhydryl chloride by treatment with hydrogen chloride. A suspension of 18.7 g. (0.125 mol) of silver cyanate in a solution of 21.6 g. (0.1 mol) of p-methylbenzhydryl chloride in 150 ml. of dry ether was refluxed with stirring for 2½ hours. Evaporation of the solvent and fractionation in vacuo yielded p-methylbenzhydryl isocyanate. B. P. 178°/16 mm.

A solution of 1.27 g. (0.01 mol) 3-quinuclidinol, 2.23 g. (0.01 mol) p-methylbenzhydryl isocyanate and 10 ml. of xylene was refluxed for 30 minutes. The product, 3-(p-methylbenzhydryl)carbamyloxy-quinuclidine monohydrate, crystallized upon cooling. It was filtered and washed with xylene and petroleum ether; M. P. 137°–138° C. Recrystallization from 15 volumes of ethyl acetate raised the melting point to 139°–140° C.

The hydrochloride was prepared by dissolving 1.05 g. (0.003 mol) of the above base in 15 ml. of ethanol, acidifying with 6 ml. of approximately 9 N alcoholic hydrochloric acid and crystallizing with 40 ml. of ether. M. P. 217°–219° C. It was recrystallized from 5 ml. methanol and 40 ml. ether. M. P. 220°–221° C. with decomposition.

EXAMPLE 4

A suspension of 13.6 g. (0.091 mol) of silver cyanate in a solution of 17 g. (0.072 mol) of p-chlorobenzhydryl chloride in 110 ml. of dry ether was refluxed and stirred for 4½ hours. After filtration the product, p-chlorobenzhydryl isocyanate, was obtained by fractional distillation in vacuo. B. P. 164° C. at 3 mm.; $n_D^{23}$=1.5863.

A solution of 1.27 g. (0.01 mol) of 3-quinuclidinol, 2.44 g. (0.01 mol) of p-chlorobenzhydryl isocyanate, and 10 ml. of xylene was refluxed for 35 minutes. Addition of 30 ml. petroleum ether precipitated an oil which then solidified. It was filtered and washed with petroleum ether, and recrystallized twice from 3 to 7 volumes ethyl acetate. The product, 3-(p-chlorobenzhydryl)carbamyloxy-quinuclidine, had M. P. 136° C.

EXAMPLE 5

A suspension of 40.0 g. (0.263 mol) of silver cyanate in a solution of 55.2 g. (0.196 mol) of p-bromobenzhydryl chloride in 275 ml. of dry ether was refluxed and stirred for 2½ hours. After filtration, the product, p-bromobenzhydryl isocyanate, was obtained by fractional distillation in vacuo. B. P. 173.5° C. at 4 mm.; $n_D^{23}$=1.6027.

A solution of 2.54 g. (0.02 mol) of 3-quinuclidinol, 5.76 g. (0.02 mol) of p-bromobenzhydryl isocyanate, and 20 ml. of xylene was refluxed 30 minutes. The hot solution was filtered from a small amount of insoluble material and the filtrate was evaporated to dryness in vacuo. The resultant glassy mass was dissolved in 20 ml. of hot ethyl acetate and crystallized by the addition of 60 ml. of petroleum ether, then recrystallized from 5 ml. of ethyl acetate and 15 ml. of petroleum ether. The product, 3-(p-bromobenzhydryl)carbamyloxy-quinuclidine, had M. P. 125°–127° C. (clear at 135° C.).

EXAMPLE 6

A suspension of 77 g. (0.36 mol) of p-methoxybenzhydryl, 100 ml. of benzene and 10 g. of anhydrous calcium chloride was treated with a stream of hydrogen chloride until 15 g. (0.41 mol) was absorbed. More anhydrous calcium chloride was added to clarify the solution, which was then filtered. The benzene was removed in vacuo at room temperature. The residue of p-methoxybenzhydryl chloride was dissolved in 250 ml. of ether and refluxed and stirred with 81 g. (0.54 mol) of silver cyanate for 3 hours. After filtering, the product, p-methoxybenzhydryl isocyanate, was isolated by fractional distillation in vacuo. B. P. 148° C. at 2 mm.; $n_D^{23}$=1.5773; $d^{23}$=1.137. It solidified upon standing and then melted at approximately 52° C.

A solution of 4.78 g. (0.02 mol) of p-methoxybenzhydryl isocyanate and 2.54 g. (0.02 mol) of 3-quinuclidinol in 20 ml. of xylene was refluxed for 1½ hours. Some insoluble material was filtered from the hot solution. The filtrate was evaporated in vacuo to a glassy mass which was taken up with 10 ml. of hot ethyl acetate. Upon cooling, the crystals produced were filtered and washed with ethyl acetate; M. P. 157°-164° C. After two recrystallizations from 10 ml. of toluene, a product, 3-(p-methoxybenzhydryl)carbamyloxy-quinuclidine melting at 166°-167.5° C., was obtained.

For the isolation of the lower melting diastereoisomeric form, the ethyl acetate mother liquor and washings were mixed with an equal volume of petroleum ether whereupon a substance of M. P. 111°-122° C., precipitated. This was recrystallized twice from 5 to 7 ml. of ethyl acetate, raising the melting point to 127°-129° C.

EXAMPLE 7

A suspension of 95.3 g. (0.39 mol) of p,p'-methoxybenzhydrol and 15 g. of anhydrous calcium chloride in 140 ml. of benzene was saturated in the cold with hydrogen chloride. After initial dissolution of the dimethoxybenzhydrol, precipitation of the reaction product began. The mixture was allowed to stand overnight. The precipitated material was filtered, then treated with enough benzene to dissolve the reaction product. The filtered benzene solution gave, upon partial evaporation and addition of petroleum ether and cooling, crystals of p,p'-dimethoxybenzhydryl chloride melting at 83°-84° C. The mother liquor was evaporated to dryness and the residue was taken up with petroleum ether. A less pure crop was then obtained which was recrystallized from benzene- petroleum ether to yield pure material.

A suspension of 21 g. (0.14 mol) of silver cyanate in the solution of 26 g. (0.099 mol) of p,p'-dimethoxybenzhydryl chloride in 70 ml. of dry ether was refluxed with stirring for 1½ hours. After filtering off the silver precipitate, the solvent was evaporated in vacuo to leave a crystalline residue of p,p'-dimethoxybenzhydryl isocyanate which was washed by grinding up with petroleum ether; M. P. 59°-61° C.

A solution of 5.38 g. (0.02 mol) of p,p'-dimethoxybenzhydryl isocyanate and 2.54 g. (0.02 mol) of quinuclidinol in 20 ml. of xylene was refluxed for ½ hour. Cooling deposited a small quantity of by-product, which was separated by filtration. To the mother liquor was added 3 ml. of 9 N alcoholic hydrochloric acid whereupon an oily precipitate was formed which was dissolved by adding 10 ml. of ethanol. Crystallization began upon standing which was increased by adding 20 ml. of ether and cooling. The filtered product was washed with ethanol and ether and recrystallized by dissolving in 20 ml. methanol and adding 20 ml. of ether to yield 3-(p,p'-dimethoxybenzhydryl)carbamyloxy - quinuclidine hydrochloride melting at 221.5°-222° C.

EXAMPLE 8

To a suspension of 50 g. (0.218 mol) of p-nitrobenzhydrol in 116 ml. of benzene were added 8 g. of anhydrous calcium chloride and dry hydrogen chloride until saturation. The mixture was then heated on a steam bath to dissolve the unreacted p-nitrobenzhydrol and again saturated with hydrogen chloride. After filtration the filtrate was fractionated in vacuo. The product, p - nitrobenzhydryl chloride, had $n_D^{25} = 1.6148$.

A suspension of 19 g. (0.127 mol) of silver cyanate in a solution of 22 g. (0.089 mol) of p-nitrobenzhydryl chloride in 65 ml. of dry ether was refluxed with stirring for 1½ hours. After filtering off the silver precipitate the filtrate was fractionated in vacuo to yield p-nitrobenzhydryl isocyanate, B. P. 160° C./0.2 mm. The material crystallized upon cooling the melted at 56°-57° C.

A solution of 2.54 g. (0.02 mol) of 3-quinuclidinol and 5.1 g. (4.42 mol) of p-nitrobenzhydryl isocyanate in 20 ml. of xylene was refluxed for 50 minutes. After cooling, 10 ml. of approximately 0.45 N alcoholic hydrochloric acid was added. Upon standing in the refrigerator, the product, 3 - (p-nitrobenzhydryl) carbamyloxy-quinuclidine hydrochloride, crystallized. It was washed with ethanol and ether. M. P. 231° C. with decomposition. It was recrystallized by dissolving in 110 ml. of methanol and adding 80 ml. of ether to yield thick prismatic needles melting at 238°-240° C. with decomposition.

The base was obtained by dissolving 2.09 g. (0.005 mol) of the hydrochloride in 20 ml. of hot water and adding 5 ml. of one N sodium hydroxide. The gummy precipitate formed became crystalline upon grinding up in a mortar. It was filtered and washed with water. M. P. 82°-88° C.

I claim:

1. A compound selected the group consisting of bases having the formula

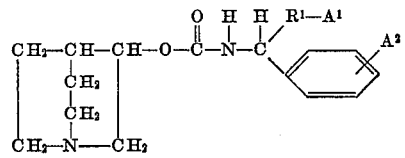

wherein $R^1$ represents a hydrocarbon radical selected from the group consisting of phenylene (—$C_6H_4$—) and cyclohexylene (—$C_6H_{10}$—), and $A^1$ and $A^2$ each represents a member of the group consisting of hydrogen, halogen, nitro, lower alkyl and lower alkoxy, and acid addition salts of said bases and quaternary ammonium salts of said bases.

2. A salt of 3-benzhydrylcarbamyloxy-quinuclidine.

3. A salt of 3-α-cyclohexylbenzylcarbamyloxy-quinuclidine.

4. 3-benzhydrylcarbamyloxy-quinuclidine.

5. 3-α-cyclohexylbenzylcarbamyloxy-quinuclidine.

ROBERT DUSCHINSKY.

No references cited.